United States Patent
Lyons

(10) Patent No.: US 11,701,605 B1
(45) Date of Patent: Jul. 18, 2023

(54) MOTOR LOAD BASED FLUID FILTER SERVICE INTERVAL

(71) Applicant: International Engine Intellectual Property Company, LLC, Lisle, IL (US)

(72) Inventor: Timothy M. Lyons, Batavia, IL (US)

(73) Assignee: International Engine Intellectual Property Company, LLC, Lisle, IL (US)

(*) Notice: Subject to any disclaimer, the term of this patent is extended or adjusted under 35 U.S.C. 154(b) by 0 days.

(21) Appl. No.: 17/733,863

(22) Filed: Apr. 29, 2022

(51) Int. Cl.
*B01D 35/14* (2006.01)
*B01D 35/143* (2006.01)
*F01M 1/02* (2006.01)
*F01M 1/20* (2006.01)
*F01M 1/10* (2006.01)
*B01D 35/00* (2006.01)

(52) U.S. Cl.
CPC ......... *B01D 35/143* (2013.01); *B01D 35/005* (2013.01); *F01M 1/02* (2013.01); *F01M 1/10* (2013.01); *F01M 1/20* (2013.01); *F01M 2250/60* (2013.01)

(58) Field of Classification Search
CPC ............... B01D 35/143; B01D 35/005; B01D 35/1435; B01D 37/046; B01D 37/048; F01M 1/02; F01M 1/10; F01M 1/20; F01M 2250/60; F02D 41/22; F02D 41/021

See application file for complete search history.

(56) References Cited

U.S. PATENT DOCUMENTS

| 6,672,147 | B1 | 1/2004 | Mazet |
| 8,480,373 | B2 | 7/2013 | Stiles, Jr. et al. |
| 11,208,926 | B2 | 12/2021 | Prabhala et al. |
| 11,339,737 | B1 * | 5/2022 | Tian ..................... B01D 37/048 |
| 2012/0074069 | A1 | 3/2012 | Ripley et al. |
| 2014/0246380 | A1 * | 9/2014 | Rohrbach .............. B01D 37/04 |
| | | | 210/167.04 |

FOREIGN PATENT DOCUMENTS

| DE | 10 2021 201265 A1 | 8/2021 |
| FR | 2787143 A1 * | 6/2000 ........... B01D 35/143 |
| JP | H10 43756 A | 2/1998 |

OTHER PUBLICATIONS

International Search Report and Written Opinion for PCT/US2023/012881, dated Apr. 17, 2023 (10 pages).

* cited by examiner

*Primary Examiner* — Syed O Hasan
(74) *Attorney, Agent, or Firm* — Mark C. Bach; Umang Khanna

(57) ABSTRACT

An arrangement and method for determining the service interval of a fluid filter includes a filter and a pump driven by an electric motor. A control module calculates pressure drop across the filter by way of voltage, current, and/or PWM provided to the electric motor. The control module monitors the rate of change of the pressure drop across the filter over the life of the filter. The volume flow rate of the fluid may or may not be held constant. If an abrupt or sudden characteristic change in the pressure drop across the filter occurs, or if the pressure drop across the filter exceeds a threshold amount, the arrangement and method provides a notification that either the filter needs to be replaced or serviced, or that it is probable that a mechanical condition has developed, depending upon the characteristics of the change in pressure drop across the filter.

17 Claims, 1 Drawing Sheet

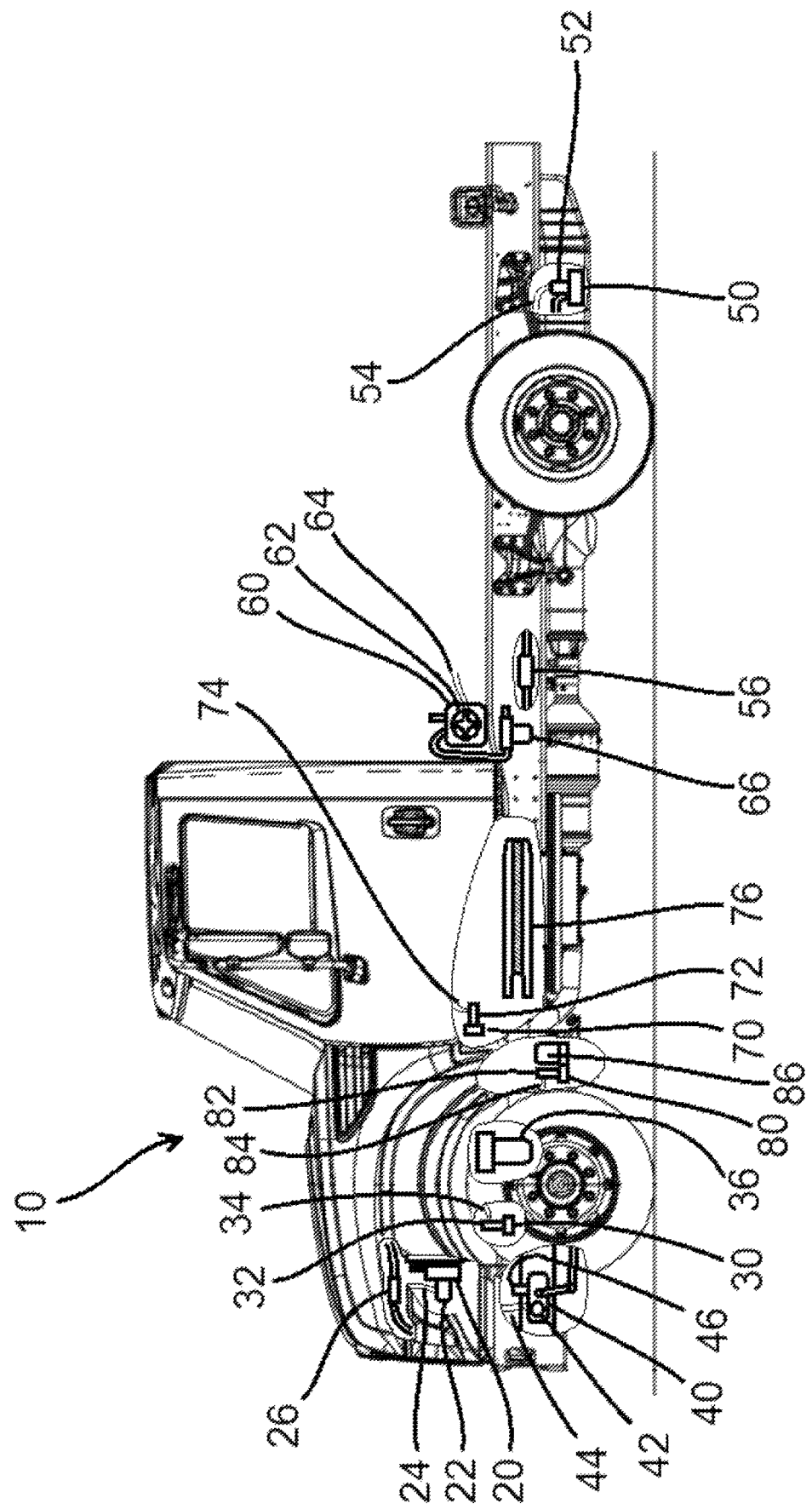

MOTOR LOAD BASED FLUID FILTER SERVICE INTERVAL

BACKGROUND

This disclosure relates to arrangements, and control logic therefor, for efficiently determining appropriate service interval for fluid filters and/or diagnosing failures of fluid filters, and methods of use thereof. Particularly, this disclosure relates to arrangements and methods for measuring filter degradation in vehicle fluid systems that utilize electrically driven fluid pumps, by way of determining resistance to fluid flow based on the load placed on the electrically driven fluid pump.

RELATED ART

Vehicles are provided with various fluid systems for purposes such as lubrication, cooling, hydraulic power, and fuel. Specifically, such fluid systems may include, for non-limiting example, cooling system(s), engine oil system(s), power steering system(s), transmission fluid system(s), Diesel Emissions Fluid (DEF) delivery system(s), and/or fuel delivery system(s). Each of these systems may be provided with one or more fluid filters, in order to remove particulates and other contaminants from the fluid. Removing such particulates and other contaminants is important to reduce wear upon the affected system. Vehicle fluid filters commonly use paper or similar materials as a filter element, which becomes increasingly clogged with particulates, and therefore resistant to fluid flow, over the life of the filter.

In order to prevent the fluid systems from failing to perform their function adequately as the fluid filters become plugged, either the element of the filter, or the filter cartridge containing the element, may be removed and replaced. Commonly, such filters and/or filter cartridges are changed according to arbitrary vehicle accumulated mileage or hours of use intervals. As a result, such filters and/or filter cartridges are often replaced before it is necessary, or are used beyond their effective life. Moreover, issues with fluid systems, and the mechanical systems which they support, often manifest as shortened filter life due to increased particulate contamination, which often remain undiagnosed, and may even be exacerbated by reduced fluid flow.

Increasingly, vehicle manufacturers are using electrically driven vehicle accessories, such as cooling fans, power steering pumps, air conditioning compressors, coolant pumps, and etcetera, in order to reduce parasitic loads on vehicle engines, particularly when full fluid flow is not needed from the fluid systems. Accordingly, there is an unmet need for an arrangement and method for more efficiently determining appropriate service interval for fluid filters, diagnosing failures of fluid filters, and measuring filter degradation in vehicle fluid systems that utilize electrically driven fluid pumps.

SUMMARY

According to one embodiment of the Motor Load Based Fluid Filter Service Interval, a vehicle has an arrangement for determining a service interval for a fluid filter. The arrangement includes a fluid circuit with a fluid filter and a fluid pump driven by an electric motor. The arrangement further includes a control module. The control module is configured to calculate pressure drop across the fluid filter by way of voltage, current, and/or Pulse Width Modulation (PWM) provided to the electric motor. The control module is also configured to monitor a rate of change of the pressure drop across the fluid filter over the life of the filter.

According to another embodiment of the Motor Load Based Fluid Filter Service Interval, an arrangement for determining the service interval of a fluid filter includes a fluid filter and a fluid pump driven by an electric motor. The arrangement further includes a control module. The control module is configured to calculate pressure drop across the fluid filter by way of voltage, current, and/or PWM provided to the electric motor. The control module is also configured to monitor a rate of change of the pressure drop across the fluid filter over the life of the filter.

According to yet another embodiment of the Motor Load Based Fluid Filter Service Interval, a method of determining the service interval of a fluid filter includes several steps. The first step is arranging a fluid circuit including a fluid filter and a fluid pump driven by an electric motor. The second step is configuring a control module to calculate pressure drop across the fluid filter by way of voltage, current, and/or PWM provided to the electric motor. The third step is further configuring the at least one control module to monitor a rate of change of the pressure drop across the fluid filter over the life of the filter.

DESCRIPTION OF THE DRAWINGS

FIG. 1 is a side view of a vehicle implementing embodiments of Motor Load Based Fluid Filter Service Interval according to the present disclosure, as described herein.

DETAILED DESCRIPTION

Embodiments described herein relate to arrangements, and control logic therefor, for efficiently determining appropriate service interval for fluid filters and/or diagnosing failures of fluid filters, and methods of use thereof. Specifically, as noted previously, embodiments described herein relate to arrangements and methods for measuring filter degradation in vehicle and other fluid systems that utilize electrically driven fluid pumps, by way of determining resistance to fluid flow based on the load placed on the electrically driven fluid pump. Embodiments of the arrangement and control logic, and methods of use thereof, may be applied for non-limiting example to various types of passenger vehicles, recreational vehicles, and commercial vehicles, such as highway or semi-tractors with and without auxiliary power units (APUs), straight trucks with and without APUs, buses, fire trucks, agricultural vehicles, construction vehicles, campers, motorhomes, motorcycles, scooters, rail travelling vehicles, and trailers with APUs or refrigeration units. It is further contemplated that, while presented herein as being used with diesel engines, embodiments of the arrangement and method may be applied to vehicles having engines configured for various fuels, such as, for non-limiting example, gasoline, diesel, propane, natural gas, and hydrogen. Moreover, embodiments of the arrangement and control logic, and methods of use thereof, may be applied to stationary applications such as, for non-limiting example, industrial and commercial hydraulic systems.

"Filtration is a physical separation process that separates solid matter and fluid from a mixture using a filter medium that has a complex structure through which only the fluid can pass. Solid particles that cannot pass through the filter medium are described as oversize and the fluid that passes through is called the filtrate. Oversize particles may form a filter cake on top of the filter and may also block the filter lattice, preventing the fluid phase from crossing the filter . . . . The size of the largest particles that can successfully pass through a filter is called the effective pore size of that filter. The separation of solid and fluid is imperfect; solids will be contaminated with some fluid and filtrate will contain fine particles (depending on the pore size, filter thickness . . . )"[1]

[1] Filtration. 24 Jan. 2022. Retrieved 25 Feb. 2022. https://en.wikipedia.org/wiki/Filtration For example, "[a]n oil filter is a filter designed to remove contaminants from engine oil, transmission oil, lubricating oil, or hydraulic oil. Their chief use is in internal-combustion engines for motor vehicles (both on- and off-road), powered aircraft, railway locomotives, ships and boats, and static engines such as generators and pumps. Other vehicle hydraulic systems, such as those in automatic transmissions and power steering, are often equipped with an oil filter . . . . Mechanical designs employ an element made of bulk material . . . or pleated filter paper to entrap and sequester suspended contaminants. As material builds up on (or in) the filtration medium, oil flow is progressively restricted. This requires periodic replacement of the filter element (or the entire filter, if the element is not separately replaceable) . . . "[2]

[2] Oil Filter. 24 Jan. 2022. Retrieved 25 Feb. 2022. https://en.wikipedia.org/wiki/Oil_filter For further example, "[a] fuel filter is a filter in a fuel line that screens out dirt and rust particles from the fuel, and is normally made into cartridges containing a filter paper. They are found in most internal combustion engines. Fuel filters serve a vital function in today's modern, tight-tolerance engine fuel systems. Unfiltered fuel may contain several kinds of contamination, for example paint chips and dirt that has been knocked into the tank while filling, or rust caused by moisture in a steel tank. If these substances are not removed before the fuel enters the system, they will cause rapid wear and failure of the fuel pump and injectors, due to the abrasive action of the particles on the high-precision components used in modern injection systems. Fuel filters also improve performance, as the fewer contaminants present in the fuel, the more efficiently it can be burnt."[3]

[3] Fuel Filter. 19 Sep. 2021. Retrieved 25 Feb. 2022. https://en.wikipedia.org/wiki/Fuel_filter "Fuel filters need to be maintained at regular interval. This is usually a case of simply disconnecting the filter from the fuel line and replacing it with a new one, although some specially designed filters can be cleaned and reused many times. If a filter is not replaced regularly it may become clogged with contaminants and cause a restriction in the fuel flow, causing an appreciable drop in engine performance as the engine struggles to draw enough fuel to continue running normally."[4]

[4] Id.

Embodiments of the Motor Load Based Fluid Filter Service Interval measure filter degradation in vehicle fluid systems that utilize electrically driven fluid pumps, by way of determining resistance to fluid flow based on the load placed on the electrically driven fluid pump. Embodiments of the arrangement and method may be used with any electrically driven fluid pump used in conjunction with a vehicle fluid circuit including a filter. Non-limiting examples may include the engine coolant pump, engine oil pump, power steering pump, hydraulic pump, fuel pump, Diesel Emissions Fluid (DEF) pump, and/or transmission oil pump. The arrangement and method uses voltage, current, and/or Pulse Width Modulation (PWM) to determine the motor effort required to support a given fluid pressure and flow provided by the electrically driven fluid pump.

Specifically, "The power imparted into a fluid [by a pump] increases the energy of the fluid per unit volume. Thus the power relationship is between the conversion of the mechanical energy of the pump mechanism and the fluid elements within the pump. In general, this is governed by a series of simultaneous differential equations, known as the Navier-Stokes equations. However a more simple equation relating only the different energies in the fluid, known as Bernoulli's equation can be used. Hence the power, P, required by the pump:

$$P=(\Delta p \times Q)/\eta$$

where $\Delta p$ is the change in total pressure between the inlet and outlet (in Pa), and Q, the volume flow-rate of the fluid is given in m³/s . . . $\eta$ is the pump efficiency, and may be given by the manufacturer's information, such as in the form of a pump curve, and is typically derived from either fluid dynamics simulation . . . or by testing. The efficiency of the pump depends upon the pump's configuration and operating conditions (such as rotational speed, fluid density and viscosity etc.)

$$\Delta P=(v_2^2-v_1^2)/2+\Delta zg+\Delta p_{static}/\rho$$

For a typical "pumping" configuration, the work is imparted on the fluid, and is thus positive. . . . Power required to drive the pump is determined by dividing the output power by the pump efficiency."[5]

[5] Pump. 7 Feb. 2022. Retrieved 15 Feb. 2022. https://en.wikipedia.org/wiki/Pump Therefore, pressure drop through the filter $\Delta p_{filter}$ can be calculated as a function of motor/pump power $P_{pump}$, volume flow-rate of the fluid Q, pressure drop through the remainder of the fluid circuit $\Delta p_{circuit}$, and pump efficiency $\eta_{pump}$:

$$((P_{pump} \times \eta_{pump})/Q)-\Delta p_{circuit}=\Delta p_{filter}$$

Meanwhile, with regards to power produced by the electric motor, "Where rpm is shaft speed and T is torque, a motor's mechanical power output $P_{em}$ is given by, in Imperial units with T expressed in foot-pounds, $$P_{em}=(rpm \times T)/5252 \text{ (horsepower), and,}$$

in SI units with shaft angular speed expressed in radians per second, and T expressed in newton-meters, $$P_{em}=\text{angular speed} \times T \text{ (watts)} \ldots$$

Motor losses are mainly due to resistive losses in windings. Core losses and mechanical losses in bearings, and aerodynamic losses, particularly where cooling fans are present, also occur. Losses also occur in commutation, mechanical commutators spark, and electronic commutators and also dissipate heat . . . To calculate a motor's efficiency, the mechanical output power is divided by the electrical input power:

$$\eta=P_m/P_e$$

where $\eta$ is energy conversion efficiency, $P_e$ is electrical input power, and $P_m$ is mechanical output power:

$$P_e=I \times V$$

$$P_m=T \times \omega$$

where V is input voltage, I is input current, T is output torque, and $\omega$ is output angular velocity."[6]

[6] Electric Motor. 4 Feb. 2022. Retrieved 16 Feb. 2022. https://en.wikipedia.org/wiki/Electric_motor Solving for mechanical output power gives $P_e \times \eta_{motor}=P_m$. Setting electric motor mechanical output power equal to the input power of the pump gives:

$$\Delta p_{filter}=((I \times V \times \eta_{motor} \times \eta_{pump})/Q)-\Delta p_{circuit}$$

Therefore, given that the volume flow rate of the fluid Q is held constant, pressure drop over the filter $\Delta p_{filter}$ is a function of the current I and voltage V as the pressure drop over the remainder of the fluid circuit $\Delta p_{circuit}$ remains the same for a given flow rate Q. Alternately, if the volume flow rate of the fluid Q is not held constant, pressure drop over the filter $\Delta p_{filter}$ is a function of the current I, voltage V, the volume flow rate of the fluid Q, and the pressure drop over the remainder of the fluid circuit $\Delta p_{circuit}$. In this case, the pressure drop over the remainder of the fluid circuit $\Delta p_{circuit}$ is a function of the volume flow rate of the fluid Q that may be determined and mapped experimentally.

Pressure drop across a vehicle fluid filter may increase linearly over the life of the filter, or may increase non-linearly, as particulates accumulate on the surface and within the matrix of the filter element. Conversely, filter effectiveness, in terms of preventing the passage of smaller particles, may actually increase over the life of the filter as larger pores in the filter medium are blocked by particles. Therefore, while a filter must not be allowed to excessively restrict fluid flow due to pressure drop resulting from accumulated particulates, changing filters too often can actually reduce overall filtration, in addition to increasing maintenance cost and downtime.

Other mechanical conditions may cause sudden characteristic changes in pressure drop across a vehicle fluid filter. For example, a sudden mechanical failure may produce a cascade of particulates that suddenly increase the accumulation of debris on the filter. For further example, coolant contamination in engine oil, or water contamination in vehicle fuel, may cause the filter element to swell and restrict flow. Additionally, a mechanical failure of the filter element itself, such as a perforation, may result in a sudden decrease in flow restriction.

Embodiments of the present Motor Load Based Fluid Filter Service Interval, therefore, calculate pressure drop across vehicle fluid filters by way of the calculations previously given, and monitor the pressure drop over the life of each filter. If an abrupt or sudden characteristic change in the pressure drop across a vehicle fluid filter occurs, or if the pressure drop across a vehicle fluid filter exceeds a threshold amount, the arrangement and method provides a notification or notifications that either the vehicle fluid filter needs to be replaced or serviced, or that it is probable that a mechanical condition has developed, depending upon the characteristics of the change in pressure drop across the vehicle fluid filter. Notification may be by way of a vehicle indicator, or by way of remote indication by way of electronic signal.

An abrupt or sudden characteristic change in the pressure drop across a vehicle fluid filter may include, for non-limiting example:

An unusual or sudden increase in the rate of increase in pressure drop, whether or not the value of the pressure drop exceeds a normal end of filter life threshold, indicating a sudden mechanical failure producing a cascade of particulates.

An unusually non-linear or abrupt change in the rate of increase in pressure drop, indicating fluid contamination in the fluid system.

A sudden decrease in pressure drop, indicating a failure or perforation in the filter element, or ongoing failure of the fluid pump itself.

Other unusual or abrupt change in the rate of increase in pressure drop, indicating a failure such as a leak or clogging of the fluid circuit itself.

Embodiments of the present Motor Load Based Fluid Filter Service Interval may accomplish their calculation of pressure drop across the vehicle fluid filter(s), sensing of current, voltage, and/or flow rate, calculation of pressure drop across the remainder of the fluid circuit, and/or monitoring of the rate of change in pressure drop across the vehicle fluid filter using software that resides in an Engine Control Module, Engine Control Unit, Vehicle Control Module, or in another dedicated control module.

As noted previously, Pulse Width Modulation (PWM) may be used in lieu of electrical current to determine the motor effort required to support a given fluid pressure and flow provided by the electrically driven fluid pump. "Pulse-width modulation . . . is a method of reducing the average power delivered by an electrical signal, by effectively chopping it up into discrete parts. The average value of voltage (and current) fed to the load is controlled by turning the switch between supply and load on and off at a fast rate. The longer the switch is on compared to the off periods, the higher the total power supplied to the load. . . . PWM is particularly suited for running inertial loads such as motors, which are not as easily affected by this discrete switching, because their inertia causes them to react slowly. The PWM switching frequency has to be high enough not to affect the load, which is to say that the resultant waveform perceived by the load must be as smooth as possible. . . . The main advantage of PWM is that power loss in the switching devices is very low. When a switch is off there is practically no current, and when it is on and power is being transferred to the load, there is almost no voltage drop across the switch. Power loss, being the product of voltage and current, is thus in both cases close to zero. PWM also works well with digital controls, which, because of their on/off nature, can easily set the needed duty cycle."[7] In embodiments that use PWM in lieu of electrical current to determine the motor effort required to support a given fluid pressure and flow provided by the electrically driven fluid pump, the average current is derived from the discrete parts of power delivered to the electric motor.

Pulse-width modulation. 24 Jan. 2022. Retrieved 16 Feb. 2022. https://en.wikipedia.org/wiki/Pulse-width_modulation Embodiments of the present Motor Load Based Fluid Filter Service Interval provide arrangements and methods that more efficiently determine appropriate service intervals for vehicle fluid filters, avoiding changing vehicle fluid filters unnecessarily, as well as providing capabilities to diagnose failures in vehicle fluid systems and the vehicle components with which they are associated. This supports efficiency improvements such as less down time for owners and operators, particularly with respect to commercial vehicles. Embodiments of the present Motor Load Based Fluid Filter Service Interval may require no or minimal extra hardware, and may only require additional software and calibration.

Turning now to FIG. 1, a vehicle 10 implementing an embodiment of the present Motor Load Based Fluid Filter Service Interval is shown. An electric coolant pump 20 is powered by a coolant pump electric motor 22, which is connected to one or more controllers (not shown) by way of at least one coolant pump electrical connection 24. The electric coolant pump 20 pumps coolant through a cooling circuit that includes at least one coolant filter 26. The embodiment of the present Motor Load Based Fluid Filter Service Interval calculates pressure drop across the at least one coolant filter 26 by way of the calculations previously given, and monitors the pressure drop over the life of the at least one coolant filter 26. If an abrupt or sudden characteristic change in the pressure drop across the at least one coolant filter 26 occurs, or if the pressure drop across the at least one coolant filter 26 exceeds a threshold amount, the arrangement and method provides a notification or notifications that either the at least one coolant filter 26 needs to be replaced or serviced, or that it is probable that a mechanical condition has developed, depending upon the characteristics of the change in pressure drop across the at least one coolant filter 26.

Similarly, an electric engine oil pump 30 is powered by an engine oil pump electric motor 32, which is also connected to one or more controllers (not shown) by way of at least one engine oil pump electrical connection 34. The electric engine oil pump 30 pumps engine oil through an engine oil circuit that includes at least one engine oil filter 36. The embodiment of the present Motor Load Based Fluid Filter Service Interval calculates pressure drop across the at least one engine oil filter 36 by way of the calculations previously given, and monitors the pressure drop over the life of the at least one engine oil filter 36. If an abrupt or sudden characteristic change in the pressure drop across the at least one engine oil filter 36 occurs, or if the pressure drop across the at least one engine oil filter 36 exceeds a threshold amount, the arrangement and method provides a notification or notifications that either the at least one engine oil filter 36 needs to be replaced or serviced, or that it is probable that a mechanical condition has developed, depending upon the characteristics of the change in pressure drop across the at least one engine oil filter 36.

In the same way, an electric power steering pump 40 is powered by a power steering pump electric motor 42, which is again connected to one or more controllers (not shown) by way of at least one power steering pump electrical connection 44. The electric power steering pump 40 pumps power steering fluid through a power steering fluid circuit that includes at least one power steering fluid filter 46. The embodiment of the present Motor Load Based Fluid Filter Service Interval calculates pressure drop across the at least one power steering fluid filter 46 by way of the calculations previously given, and monitors the pressure drop over the life of the at least one power steering fluid filter 46. If an abrupt or sudden characteristic change in the pressure drop across the at least one power steering fluid filter 46 occurs, or if the pressure drop across the at least one power steering fluid filter 46 exceeds a threshold amount, the arrangement and method provides a notification or notifications that either the at least one power steering fluid filter 46 needs to be replaced or serviced, or that it is probable that a mechanical condition has developed, depending upon the characteristics of the change in pressure drop across the at least one power steering fluid filter 46.

Similarly, an electric fuel pump 50 is powered by a fuel pump electric motor 52, which is again connected to one or more controllers (not shown) by way of at least one fuel pump electrical connection 54. The electric fuel pump 50 pumps fuel through a fuel circuit that includes at least one fuel filter 56. The embodiment of the present Motor Load Based Fluid Filter Service Interval again calculates pressure drop across the at least one fuel filter 56 by way of the calculations previously given, and monitors the pressure drop over the life of the at least one fuel filter 56. If an abrupt or sudden characteristic change in the pressure drop across the at least one fuel filter 56 occurs, or if the pressure drop across the at least one fuel filter 56 exceeds a threshold amount, the arrangement and method provides a notification or notifications that either the at least one fuel filter 56 needs to be replaced or serviced, or that it is probable that a mechanical condition has developed, depending upon the characteristics of the change in pressure drop across the at least one fuel filter 56.

Similarly, an electric hydraulic pump 60 is powered by a hydraulic pump electric motor 62, which is again connected to one or more controllers (not shown) by way of at least one hydraulic pump electrical connection 64. The electric hydraulic pump 60 pumps hydraulic oil through a hydraulic circuit that includes at least one hydraulic oil filter 66. The embodiment of the present Motor Load Based Fluid Filter Service Interval again calculates pressure drop across the at least one hydraulic oil filter 66 by way of the calculations previously given, and monitors the pressure drop over the life of the at least one hydraulic oil filter 66. If an abrupt or sudden characteristic change in the pressure drop across the at least one hydraulic oil filter 66 occurs, or if the pressure drop across the at least one hydraulic oil filter 66 exceeds a threshold amount, the arrangement and method provides a notification or notifications that either the at least one hydraulic oil filter 66 needs to be replaced or serviced, or that it is probable that a mechanical condition has developed, depending upon the characteristics of the change in pressure drop across the at least one hydraulic oil filter 66.

Similarly, an electric transmission oil pump 70 is powered by a transmission oil pump electric motor 72, which is again connected to one or more controllers (not shown) by way of at least one transmission oil pump electrical connection 74. The electric transmission oil pump 70 pumps transmission oil through a transmission oil circuit that includes at least one transmission oil filter 76. The embodiment of the present Motor Load Based Fluid Filter Service Interval again calculates pressure drop across the at least one transmission oil filter 76 by way of the calculations previously given, and monitors the pressure drop over the life of the at least one transmission oil filter 76. If an abrupt or sudden characteristic change in the pressure drop across the at least one transmission oil filter 76 occurs, or if the pressure drop across the at least one transmission oil filter 76 exceeds a threshold amount, the arrangement and method provides a notification or notifications that either the at least one transmission oil filter 76 needs to be replaced or serviced, or that it is probable that a mechanical condition has developed, depending upon the characteristics of the change in pressure drop across the at least one transmission oil filter 76.

Similarly, an electric DEF pump 80 is powered by a DEF pump electric motor 82, which is again connected to one or more controllers (not shown) by way of at least one DEF pump electrical connection 84. The electric DEF pump 80 pumps fuel through a DEF circuit that includes at least one DEF filter 86. The embodiment of the present Motor Load Based Fluid Filter Service Interval again calculates pressure drop across the at least one DEF filter 86 by way of the calculations previously given, and monitors the pressure drop over the life of the at least one DEF filter 86. If an abrupt or sudden characteristic change in the pressure drop across the at least one DEF filter 86 occurs, or if the pressure drop across the at least one DEF filter 86 exceeds a threshold amount, the arrangement and method provides a notification or notifications that either the at least one DEF filter 86 needs to be replaced or serviced, or that it is probable that a mechanical condition has developed, depending upon the characteristics of the change in pressure drop across the at least one DEF filter 86.

While illustrative arrangements, and control logic therefor, implementing the Motor Load Based Fluid Filter Service Interval have been described with respect to at least one embodiment, the arrangements and methods can be further modified within the spirit and scope of this disclosure, as demonstrated previously. This application is therefore intended to cover any variations, uses, or adaptations of the arrangement and method using its general principles. Further, this application is intended to cover such departures from the present disclosure as come within known or customary practice in the art to which the disclosure pertains and which fall within the limits of the appended claims.

What is claimed is:

1. A vehicle having an arrangement for determining a service interval for a fluid filter, comprising: a fluid circuit including a fluid filter and a fluid pump driven by an electric motor; at least one control module configured to calculate pressure drop across the fluid filter by way of at least one of voltage, current, and Pulse Width Modulation (PWM) provided to the electric motor; wherein the pressure drop is a function of pump power, volume flow-rate of the fluid, pressure drop through the remainder of the fluid circuit and pump efficiency; the at least one control module being configured to monitor a rate of change of the pressure drop across the fluid filter over the life of the filter; and the at least one control module being further configured to determine whether the pressure drop or the rate of change of the pressure drop across the fluid filter exceeds a threshold amount, and to provide a notification that the fluid filter needs to be replaced or serviced.

2. The vehicle of claim 1, wherein:
the at least one control module being configured to calculate the pressure drop across the fluid filter by way of the following function:

$$\Delta p_{filter} = ((I \times V \times \eta_{motor} \times \eta_{pump})/Q) - \Delta p_{circuit}$$

wherein $\Delta p_{filter}$ is the pressure drop across the fluid filter, I is electrical current provided to the electric motor, V is voltage provided to the electric motor, $\eta_{motor}$ is efficiency of the electric motor, $\eta_{pump}$ is efficiency of the fluid pump, Q is volume flow rate of a fluid in the fluid circuit, and $\Delta p_{circuit}$ is pressure drop across a remainder of the fluid circuit.

3. The vehicle of claim 2, wherein:
the volume flow rate of the fluid Q is held constant, such that the pressure drop over the filter $\Delta p_{filter}$ is a function of the current I, voltage V, the volume flow rate of the fluid Q, and the pressure drop over the remainder of the fluid circuit $\Delta p_{circuit}$, which pressure drop over the remainder of the fluid circuit $\Delta p_{circuit}$ remains the same for a given flow rate Q.

4. The vehicle of claim 2, wherein:
the volume flow rate of the fluid Q is not held constant, such that the pressure drop over the filter $\Delta p_{filter}$ is a function of the current I, voltage V, the volume flow rate of the fluid Q, and the pressure drop over the remainder of the fluid circuit $\Delta p_{circuit}$, which pressure drop over the remainder of the fluid circuit $\Delta p_{circuit}$ is a function of the volume flow rate of the fluid Q that is determined experimentally, and mapped within the at least one control module.

5. The vehicle of claim 1, wherein:
the at least one control module being further configured to determine whether the pressure drop or the rate of change of the pressure drop across the fluid filter has undergone an abrupt or sudden characteristic change, and to provide a notification that it is probable that a mechanical condition has developed.

6. The vehicle of claim 5, wherein:
the at least one control module being further configured to recognize an unusual or sudden increase or decrease in the pressure drop or the rate of change of the pressure drop across the fluid filter indicating at least one of:
a mechanical failure producing a cascade of particulates,
fluid contamination of the fluid circuit,
failure or perforation of the fluid filter,
failure of the fluid pump, and
a leak or clog in the fluid circuit.

7. An arrangement for determining the service interval of a fluid filter, comprising: a fluid circuit including a fluid filter and a fluid pump driven by an electric motor; at least one control module configured to calculate pressure drop across the fluid filter by way of at least one of voltage, current, and PWM provided to the electric motor; wherein the pressure drop is a function of pump power, volume flow-rate of the fluid, pressure drop through the remainder of the fluid circuit and pump efficiency; the at least one control module being configured to monitor a rate of change of the pressure drop across the fluid filter over the life of the filter; and the at least one control module being further configured to determine whether the pressure drop or the rate of change of the pressure drop across the fluid filter has undergone an abrupt or sudden characteristic change, and to provide a notification that it is probable that a mechanical condition has developed.

8. The arrangement of claim 7, wherein:
the at least one control module being configured to calculate the pressure drop across the fluid filter by way of the following function:

$$\Delta p_{filter} = ((I \times V \times \eta_{motor} \times \eta_{pump})/Q) - \Delta p_{circuit}$$

wherein $\Delta p_{filter}$ is the pressure drop across the fluid filter, I is electrical current provided to the electric motor, V is voltage provided to the electric motor, $\eta_{motor}$ is efficiency of the electric motor, $\eta_{pump}$ is efficiency of the fluid pump, Q is volume flow rate of a fluid in the fluid circuit, and $\Delta p_{circuit}$ is pressure drop across a remainder of the fluid circuit.

9. The arrangement of claim 8, wherein:
the volume flow rate of the fluid Q is held constant, such that the pressure drop over the filter $\Delta p_{filter}$ is a function of the current I, voltage V, the volume flow rate of the fluid Q, and the pressure drop over the remainder of the fluid circuit $\Delta p_{circuit}$, which pressure drop over the remainder of the fluid circuit $\Delta p_{circuit}$ remains the same for a given flow rate Q.

10. The arrangement of claim 8, wherein:
the volume flow rate of the fluid Q is not held constant, such that the pressure drop over the filter $\Delta p_{filter}$ is a function of the current I, voltage V, the volume flow rate of the fluid Q, and the pressure drop over the remainder of the fluid circuit $\Delta p_{circuit}$, which pressure drop over the remainder of the fluid circuit $\Delta p_{circuit}$ is a function of the volume flow rate of the fluid Q that is determined experimentally, and mapped within the at least one control module.

11. The arrangement of claim 7, wherein:
the at least one control module being further configured to determine whether the pressure drop or the rate of change of the pressure drop across the fluid filter exceeds a threshold amount, and to provide a notification that the fluid filter needs to be replaced or serviced.

12. The arrangement of claim 7, wherein: the at least one control module being further configured to recognize an unusual or sudden increase or decrease in the pressure drop or the rate of change of the pressure drop across the fluid filter indicating at least one of: a mechanical failure producing a cascade of particulates, fluid contamination of the fluid circuit, failure or perforation of the fluid filter, failure of the fluid pump, and a leak or clog in the fluid circuit.

13. A method of determining the service interval of a fluid filter, comprising the steps of: arranging a fluid circuit including a fluid filter and a fluid pump driven by an electric motor; configuring at least one control module to calculate pressure drop across the fluid filter by way of at least one of voltage, current, and PWM provided to the electric motor; wherein the pressure drop is a function of pump power, volume flow-rate of the fluid, pressure drop through the remainder of the fluid circuit and pump efficiency; configuring the at least one control module to monitor a rate of change of the pressure drop across the fluid filter over the life of the filter; and further configuring the at least one control module to determine whether the pressure drop or the rate of change of the pressure drop across the fluid filter exceeds a threshold amount, and to provide a notification that the fluid filter needs to be replaced or serviced.

14. The method of claim 13, further comprising the steps of:
configuring the at least one control module to calculate the pressure drop across the fluid filter by way of the following function:

$$\Delta p_{filter} = ((I \times V \times \eta_{motor} \times \eta_{pump})/Q) - \Delta p_{circuit}$$

wherein $\Delta p_{filter}$ is the pressure drop across the fluid filter, I is electrical current provided to the electric motor, V is voltage provided to the electric motor, $\eta_{motor}$ is efficiency of the electric motor, $\eta_{pump}$ is efficiency of the fluid pump, Q is volume flow rate of a fluid in the fluid circuit, and $\Delta p_{circuit}$ is pressure drop across a remainder of the fluid circuit.

15. The method of claim 14, further comprising the steps of:
holding the volume flow rate of the fluid Q constant, such that the pressure drop over the filter $\Delta p_{filter}$ is a function of the current I, voltage V, the volume flow rate of the fluid Q, and the pressure drop over the remainder of the fluid circuit $\Delta p_{circuit}$, which pressure drop over the remainder of the fluid circuit $\Delta p_{circuit}$ remains the same for a given flow rate Q.

16. The method of claim 14, further comprising the steps of:
allowing the volume flow rate of the fluid Q to vary, such that the pressure drop over the filter $\Delta p_{filter}$ is a function of the current I, voltage V, the volume flow rate of the fluid Q, and the pressure drop over the remainder of the fluid circuit $\Delta p_{circuit}$;
experimentally determining the pressure drop over the remainder of the fluid circuit $\Delta p_{circuit}$ as a function of the volume flow rate of the fluid Q, and
mapping within the at least one control module the pressure drop over the remainder of the fluid circuit $\Delta p_{circuit}$ as a function of the volume flow rate of the fluid Q.

17. The method of claim 13, further comprising the steps of:
configuring the at least one control module to determine whether the pressure drop or the rate of change of the pressure drop across the fluid filter has undergone an abrupt or sudden characteristic change, and to provide a notification that it is probable that a mechanical condition has developed.

* * * * *